United States Patent
Kodirov et al.

(10) Patent No.: US 12,197,535 B2
(45) Date of Patent: Jan. 14, 2025

(54) DETERMINING A DENOISED NAMED ENTITY RECOGNITION MODEL AND A DENOISED RELATION EXTRACTION MODEL

(71) Applicant: Siemens Aktiengesellschaft, Munich (DE)

(72) Inventors: Ulugbek Kodirov, Munich (DE); Rakebul Hasan, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1073 days.

(21) Appl. No.: 17/102,965

(22) Filed: Nov. 24, 2020

(65) Prior Publication Data
US 2022/0164598 A1    May 26, 2022

(51) Int. Cl.
G06N 20/00    (2019.01)
G06F 18/20    (2023.01)
G06F 18/211   (2023.01)
G06F 18/213   (2023.01)
G06F 18/214   (2023.01)
G06N 5/02     (2023.01)

(52) U.S. Cl.
CPC .......... *G06F 18/213* (2023.01); *G06F 18/211* (2023.01); *G06F 18/214* (2023.01); *G06F 18/29* (2023.01); *G06N 5/02* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,048,979 B1* | 6/2021 | Zhdanov | G06F 18/2155 |
| 2019/0034829 A1* | 1/2019 | Guim Bernat | G06F 3/0655 |
| 2019/0294758 A1* | 9/2019 | Prozuments | G06N 3/08 |
| 2020/0233899 A1* | 7/2020 | McAuliffe | G06F 16/9024 |
| 2021/0224651 A1* | 7/2021 | Crone | G06N 3/04 |
| 2021/0294828 A1* | 9/2021 | Tomkins | G06N 5/022 |
| 2021/0390256 A1* | 12/2021 | Liu | G06F 18/254 |

* cited by examiner

*Primary Examiner* — Xuyang Xia
(74) *Attorney, Agent, or Firm* — Schmeiser, Olsen & Watts LLP

(57) ABSTRACT

A computer-implemented method for determining a denoised named entity recognition (NER)-model and denoised relation extraction (RE)-model. A computer-implemented method for propagating an input dataset into a graph database representation, a computing unit and a computer program product, is also provided.

8 Claims, 2 Drawing Sheets

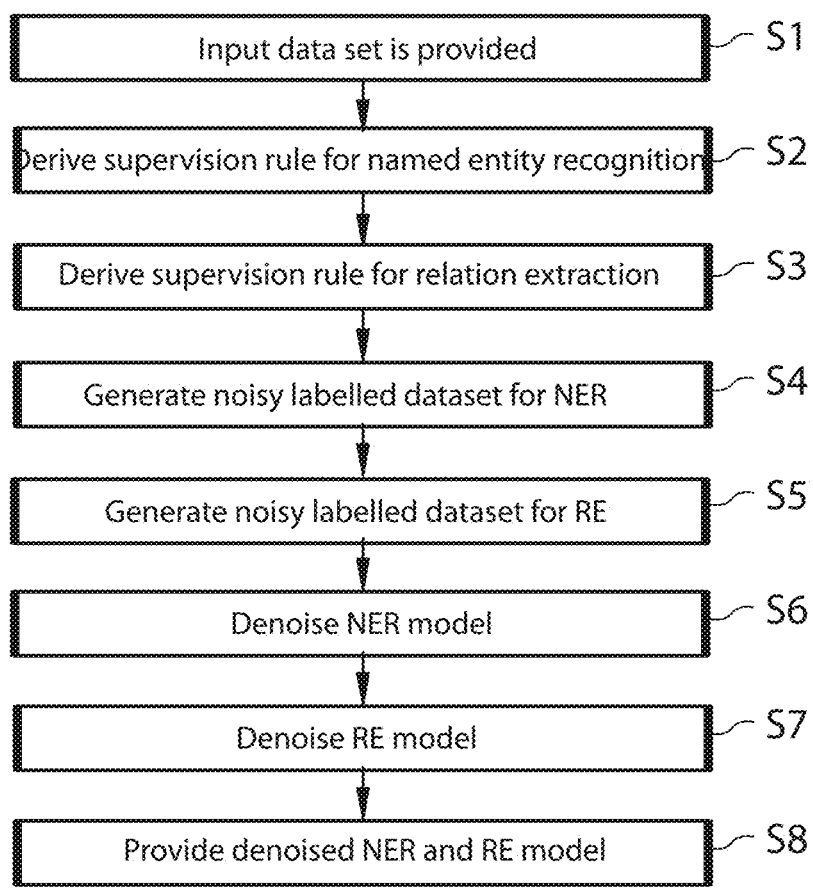

FIG 2

← → C ⌂ ⓐ wiki.siemens.com/display/en/Digitalization+Glossary

› Home › Global Wiki English › Digitalization Glossary ⓘ Attachments

Digitalization Glossary ⓘ Attachments (14)

Go to
[#][A][B][C][D][E][F][G][H][I][J][K][L]
🔍 = Recommended entries because of high content quantify
- 3D Printing A
- A/B Testing
- Accelerator
- Adaptive Security Architecture
- Agile
  - Agile Development
  - Agile Learning Design
  - Agile Project Management
- Algorithm
- Analytics 🔍
  - Data Analytics
  - Data Mining
  - Descriptive Analytics
  - Diagnostic Analytics
  - Predictive Analytics
  - Prescriptive Analytics
  - Self-service Business Intelligence
  - Text Mining
- Angel Investor
- Application Programming Interface (API)
- Artificial Intelligence (AI) 🔍
  - IBM Watson
  - Machine Learning
- Artificial Intelligence Bots 🔍
- Artificial Neural Networks (ANN)
- Aspect
- Asset / Asset Group
- Augmented Reality (AR)

Artificial Intelligence [AI] ⓘ Attachments (4) 💬 Comments (0)

| Department | Contact |
|---|---|
| ... | ... |
| ... | ... |

Summary

Artificial Intelligence [AI] automates tasks which usually require human perceptual skills such as natural language processing, image recognition, big data analysis or the generation of hypotheses. Trough improved software algorithms and more powerful hardware as well as a decline in costs for data processing and storage. AI offers huge range of capabilities for the automation of tasks at a affordable price. Artificial intelligence is an area of computer science that emphasizes the creation of intelligent machines that work and react like humans and carry out tasks in a way that we deem "smart". Artificial intelligence must have access to objects, categories, properties and relations between all of them to implement knowledge engineering. Initiating common sense, reasoning and problem-solving power in machines is a difficult and tedious approach.

Machine Learning is another aspect of Artificial Intelligence. Machine learning is a method of data analysis that automates analytical model building. Using algorithms that repeatedly learn from data, machine learning allows computers to find hidden insights without being explicitly programmed where to look. Two important breakthroughs led to the emergence of Machine Learning as the vehicle which is driving AI: the realization that we can program computers to learn for themselves and the emergence of the internet.

Digitalization Subtopics:

10

20 → Knowledge Graph

DETERMINING A DENOISED NAMED ENTITY RECOGNITION MODEL AND A DENOISED RELATION EXTRACTION MODEL

1. FIELD OF TECHNOLOGY

The present invention relates to a Computer-implemented method for determining a denoised named entity recognition model and a denoised relation extraction model, wherein the denoised models are applicable on text data to propagate text data into a graph database representation. Further, the invention relates to a corresponding computer-implemented method for propagating an input dataset into a graph database representation, a computing unit and a computer program product.

2. BACKGROUND

Knowledge Graphs ("KGs") are gaining importance in the course of digitalization. Exemplary applications of the KGs are e.g. information retrieval, recommendation, clustering, entity resolution and generic exploratory search.

KGs are known from the prior art, according to which they structure information in graph form, by representing entities e.g. people, places, objects as nodes and relationships or relations between the entities as edges. Moreover, facts are typically represented as triples, namely (Subject, Predicate, Object) "SPO" triples. Two nodes which are connected by a relationship form a fact.

The KG population, according to which knowledge or any other input data is populated into the KG is essential for the usability of the KG.

According to prior art, early approaches for populating KGs were closely related to ontology-based information extraction. Therefore, usually, an extraction toolkit is used for the object identification or named-entity recognition to extract instances of concepts and extract relationships between those instances. Then, the extracted information is assimilated into the KG.

However, the disadvantage is that most early approaches rely on pattern-based information extraction. Moreover, most of these early approaches do not consider the binary relation extraction problem.

In more detail, they are either applicable for entity level extraction or relations have to be represented as entities (the technical term for representing relations as entities is "reification"). Representing relations as entities, however, results in an unnatural representation of final KG, and hence such a KG requires inefficient post-processing steps in order to normalize the representation. The post-processing is complex and time-consuming. Hence, most of the known approaches solely focus on entity extraction and neglect the relation extraction for simplicity.

It is therefore an objective of the invention to provide a computer-implemented method for determining a denoised named entity recognition model and denoised relation extraction model in an efficient and reliable manner, wherein the denoised models are applicable on text data to propagate the text data into a graph database representation.

3. SUMMARY

This problem is according to one aspect of the invention solved by a Computer-implemented method for determining a denoised named entity recognition model and a denoised relation extraction model; comprising the steps:

a. Providing an input dataset with raw texts;
b. Generating an ontology using semantic analysis based on the input dataset; wherein
the ontology comprises a plurality of entity types and a plurality of respective relation types between pairs of the entity types;
c. Deriving at least one distant supervision rule for named entity recognition for each entity type of the plurality of entity types and at least one distant supervision rule for relation extraction for each relation type of the plurality of relation types between respective pairs of derived entity types from the generated ontology;
d. Generating at least one noisy labelled dataset for the named entity recognition by applying the at least one distant supervision rule for the named entity recognition on the input dataset to extract a plurality of entity mentions from the input dataset;
e. Generating a least one noisy labelled dataset for the relation extraction by applying the at least one distant supervision rule for the relation extraction on the input dataset to extract a plurality of respective relation mentions between pairs of the entity mentions from the input dataset;
f. Denoising a named entity recognition model and the at least one noisy labelled dataset for the named entity recognition using active learning to interactively query a user in an active learning loop; wherein
the user corrects at least one predicted entity type of the named entity recognition model demonstrating least or low confidence by confirmation or rejection;
g. Denoising a relation extraction model and the at least one noisy labelled dataset for the relation extraction using active learning to interactively query a user in an active learning loop; wherein
the user corrects at least one predicted relation type of the relation extraction model demonstrating least or low confidence by confirmation or rejection; wherein
the relation extraction model uses the at least one predicted entity type of the named entity recognition model to predict the at least one relation type; and
h. Providing the denoised named entity recognition model and the denoised relation extraction model.

Accordingly, the invention is directed to a Computer-implemented method for determining a denoised named entity recognition model and a denoised relation extraction model. Thereby, the resulting two models are machine learning models. The term "named entity recognition" is abbreviated with "NER" and the term "relation extraction" with RE in the following.

For example, spaCy can be used for NER and a model based on BERT and SpanBERT, BERTem+MTB, can be used for RE. Thereby, a pre-trained SpanBERT can be used instead of BERT ("Bidirectional Encoder Representations from Transformers") and extended with a fine-tuning strategy from BERTem+MTB.

In a first step, an input dataset is provided in form of text data or raw texts, hence unprocessed data. The text can be structured in sentences.

In further steps, the ontology, distant supervisions rules for NER and RE, respectively, are determined by means of the semantic analysis. Thereby, the distant supervision is required to retrieve the respective noisy labelled datasets for NER and RE.

More specifically, the distant supervision rules for named entity recognition are determined for at least two entity types, according to which at least one distant supervision rule per entity type. Hence, for binary relation extraction, a relation instance needs one entity instance in the subject and one entity instance in the object.

For the determination of the distant supervision rules for relation extraction, the relation type is associated to the entity types for which the distant supervision rules are already determined, NER. Accordingly, a relation type is associated to two entity types: one in the subject and one in the object.

In further steps, a NER-model and a RE-model are denoised by means of active learning. Active learning allows the labelling of data more efficiently compared to prior art supervised learning approaches based on random sampling. This way, wrong or incorrect data labels can be reduced.

Active learning can interactively query a user, also called an expert to label new data points with the desired outputs. Thereby, the most informative data points are sampled for labelling. This enables data-efficient training. The query strategy for active learning can depend on how one measures the informativeness of a sample. Distinct strategies can be used e.g. uncertainty.

More specifically, the NER-model e.g. queries those data points for which its predictions demonstrate least or low confidence. The NER-model can be trained on gold labelled data and the resulting NER-model can be used to denoise the dataset. The NER-model can be passed into the denoising model which can calculate the prediction confidence score of the NER-model with regards to the provided input. If a prediction confidence is higher than a certain threshold, then the prediction label will be considered as a gold label. The threshold can be a hyperparameter of the denoising model. The NER-model can be retrained on the newly obtained gold labelled data.

According to an aspect, the active learning uses uncertainty sampling as a query strategy. Accordingly, the active learning strategy can be selected in a flexible manner depending on the underlying use-case, model and other conditions e.g. user preferences.

According to another aspect, the method further comprises at least one of the steps pre-training, training, fine-tuning the respective entity recognition model, denoised entity recognition model, relation extraction model and denoised relation extraction model. Accordingly, distinct steps can be integrated in the aforementioned method.

According to an embodiment the workflow can be summarized as follows:
I. Named entity recognition (NER) model training
  I.1. Semantic analysis for NER
  I.2. Distant supervision for NER over pre-training data
  I.3. Active learning for NER over noisy pre-training data
  I.4. Denoising the pre-training data
  I.5. Distant supervision for NER over use case-specific data
  I.6. Active learning for NER over noisy use-case-specific data
  I.7. Denoising the use-case specific data
II. Relation extraction (RE) model training
  II.1. Semantic analysis for RE
  II.2. Distant supervision for RE over pre-training data
  II.3. Active learning for RE over pre-training data
  II.4. Denoising the pre-training data
  II.5. Distant supervision for RE over use case-specific data
  II.6. Active learning for RE over use case-specific data
  II.7. Denoising the use case-specific data A further aspect is a computer-implemented method for Propagating an input dataset into a graph database representation; wherein the graph database representation represents a plurality of nodes in a graph which are interconnected by respective edges; wherein
each node of the plurality of the nodes represents an entity and each edge of the plurality of the edges represents a relation between the entities; comprising the steps
  a. Providing the input dataset with raw texts and an ontology;
  b. Determining a plurality of entity types using a trained denoised named entity recognition model based on the input dataset;
  c. Selecting pairs of entity types of the plurality of determined entity types matching the provided ontology;
  d. Determining a plurality of relation types using a trained denoised relation extraction model based on the selected pairs of entity types; and
  e. Propagating the determined entity and relation types into the graph database representation.

Accordingly, the determined denoised models are applied on input data to predict the entity and relation types, which are required and used to build the graph database representation e.g. knowledge graph. Therefore, the predicted types are transformed into triples, the required format.

The advantage is that raw text can be populated into the graph in an efficient and reliable manner. On the contrary to prior art, both entity and relation extraction, and hence binary relations are considered.

A further aspect of the invention is a computing unit e.g. robot unit or another autonomous unit.

The unit may be realized as any devices, or any means, for computing, in particular for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the unit may be implemented by a cloud computing platform.

A further aspect of the invention is a computer program product directly loadable into an internal memory of a computer, comprising software code portions for performing the steps according to the aforementioned method when said computer program product is running on a computer.

4. BRIEF DESCRIPTION

In the following detailed description, presently preferred embodiments of the invention are further described with reference to the following figures:

FIG. 1 illustrates a flowchart of the method according to embodiments of the invention; and FIG. 2 illustrates input data in form of text data and output data in form of a knowledge graph according to an embodiment.

5. DETAILED DESCRIPTION

FIG. 1 illustrates a flowchart of the method according to the invention with the method steps S1 to S8. In the first step S1, an input dataset is provided in form of text data or raw texts, hence unprocessed data. The raw text can comprise a plurality of sentences in the usual sense. Exemplary input datasets are use case-specific and pre-training datasets.

Semantic Analysis

The input dataset with raw text 10 is provided for the method step S1 and hence as input for the semantic analysis, e.g. the raw texts from use case-specific data such as Wikisphere Glossary.

According to an embodiment the page titles are entity names. The page titles are grouped according to the contents or texts in their corresponding pages. Thereby, an entity type name is assigned to each group of the plurality of groups of page titles. This assignment of the entity types to the groups is required to derive the ontology. Thereby, the assigned entity types are classes in the ontology. Each entity type comprises a set of page titles which are the names of the corresponding entity type. The entity names are used as distant supervision rule for the entity extraction, NER.

According to another embodiment, there are no page titles which can be grouped. In this embodiment, an exploratory analysis has to be performed, thereby starting with a set of entity types and their corresponding entity names and involving a domain expert.

Then, the semantic analysis is performed to derive relation types between the determined entity types. These relation types correspond to the properties in the ontology.

Therefore, another exploratory analysis is performed. According to which, first sentences are extracted from the raw texts. Then, the named entity mentions are extracted for each sentence by using the distant supervision rule for entity extraction. Thereby, only those sentences are considered with more than one entity mention. This restriction is important since a relation needs to be between more than one entity, namely at least two entities. Then, the sentences are clustered along with their entity mentions. Moreover, it can be explored which pairs of entity types occur most frequently, visualizations and analysis steps can be additionally performed to derive what are the relations types that exist in the data between the entity types.

The combination of the derived entity types and the relation types constitute the resulting ontology.

Moreover, the distant supervision rules for relation extraction are determined based on the ontology. The ontology comprises binary relation types. This means that a relation has a "subject" (also called domain or head) and an "object" (also called range or tail). Thereby, the subject or the object of a relation type has associated entity types. The distant supervision rules for relation extraction, RE, are based on these entity types of the subjects and the objects of the relation types.

The semantic analysis according to the method steps S2 and S3 result in the Ontology, the distant supervision rules for named entity recognition and distant supervision rules for relation extraction, which are needed for the further method steps.

Distant Supervision and Transfer Learning

The distant supervision rules for both named entity recognition (NER) and relation extraction (RE) are each executed based on all sentences of the input dataset, resulting in respective noisy labelled datasets S4, S5. The noisy labelled datasets are required for transfer learning and for subsequent training of the machine learning models, namely the NER-machine learning model and RE-machine learning model.

The datasets are noisy in the manner that the datasets are based on strong assumptions in form of the distant supervision rules. Hence, the noisy labelled datasets comprise incorrect labels. The noise is be reduced using active learning S6, S7 to improve the accuracy of the models and their predictions.

Denoising, Active Learning, and Transfer Learning for NER
General Denoising Algorithm for NER A NER-machine learning model is trained. The training data is a fraction of the noisy labelled dataset for NER. Thereby, the number of samples for each entity type is balanced. This NER-model can be equally referred to as distantly supervised NER-model and can be considered as the base model for the active learning loop.

Further, another fraction of the noisy labelled dataset for NER, disjoint from the aforementioned training fraction, is also used. Thereby, the number of samples for each entity type is also balanced. This further fraction of the noisy labelled dataset can be equally referred to as the NER active learning validation dataset.

The validation dataset is passed to the active learning loop. In this loop, a human expert corrects the predictions of the model with least or low confidence.

These steps result in a combination of the originally correct samples in the NER active learning validation dataset and the corrected samples by the human expert. The resulting output dataset can be equally referred to as NER gold standard dataset.

Then, a new NER-machine learning model is trained from the scratch using 80% of the samples from the gold standard dataset as the training data. This model can be equally referred to as NER-denoiser. The remaining 20% of the gold standard samples are kept for evaluating the subsequent NER-models.

Then, all the samples from the initial noisy labelled dataset are passed to this NER-denoiser model to predict the entity mentions for each sentence in the samples.

Then, a sample will be kept as a correctly annotated sentence, if the following conditions are met: The prediction confidence of the NER-denoiser model is high for the sample where the measure of high is set by a threshold. At this stage, all the samples that are kept constitute the denoised labelled dataset for NER.

The denoising algorithm is applied on the noisy labelled datasets in pre-training and fine-tuning, respectively.

Pre-Training for NER (Pre-Training Data)

The denoising algorithm is performed based on the noisy labelled dataset for NER, e.g. pre-training data. This denoising results in a denoised labelled dataset for pre-training for NER.

Then, a balanced fraction of the denoised labelled dataset for pre-training for NER (80% for each entity type) and 80% of the NER gold standard dataset for pre-training are used. The remaining samples are kept for subsequent evaluations. These selected samples constitute the training dataset for the pre-trained the NER-model.

Then, a new NER-model is trained using this training dataset for the pre-trained the NER-model. This model can be equally referred to as pre-trained denoised NER-model.

Fine-Tuning for NER (Use Case-Specific Data)

The denoising algorithm is performed based on the noisy labelled dataset for NER, e.g. use case-specific Wikisphere Glossary. Therefore, the pre-trained denoised NER-model is used instead of the distantly supervised NER as the base model for active learning. The training part of the distantly supervised NER-model of the algorithm can be skipped. This denoising results in a denoised labelled dataset for a use case e.g. Wikisphere Glossary for NER.

Then, a balanced fraction of the denoised labelled dataset is selected for NER (80% for each entity type) and 80% of the NER gold standard dataset for the use case.

The remaining samples are kept for subsequent evaluations. These selected samples constitute the training dataset for fine-tuning the NER-model.

Then, the pre-trained NER-model can be fine-tuned using this training dataset for fine-tuning the NER-model. This model can be equally referred to as fine-tuned denoised NER-model.

Denoising, Active Learning, and Transfer Learning for Relation Extraction

General Denoising Algorithm for RE

The base relation extraction model can be used as the base model for an active learning loop.

The RE active learning validation dataset is passed to the active learning loop. In the loop, a human expert corrects the predictions with least or low confidence. Thereby, the prediction is the relation type for a sentence with two entity mentions.

This results in the combination of the originally correct samples in the RE active learning validation dataset and the corrected samples by the human expert. The resulting output dataset can be equally referred to RE gold standard dataset.

Then, a new relation extraction model such as SpanBERT or BERT is trained from the scratch using 80% of the samples from the RE gold standard dataset as the training data. This model can be equally referred to as RE denoiser.

The remaining 20% of the gold standard samples are kept for evaluating the subsequent RE models.

Then, all samples from the initial noisy labelled dataset are passed to this RE-denoiser model to predict the relation types for each sentence in the samples.

Subsequently, a sample will be kept as a correctly annotated sentence, if the following condition is met: The prediction confidence of the RE-denoiser model is high for the sample where the measure of high is set by a threshold.

At this stage, all the samples that are kept constitute the denoised labelled dataset for RE.

Pre-Training for RE (Pre-Training Data)

Each sentence from the noisy labelled dataset for the pre-training dataset for relation extraction is passed to the pre-trained denoised NER model to predict entity annotations.

Only those samples are kept where the original and predicted entity annotations match. The samples can be considered as base pre-training relation extraction dataset.

Further, a basic neural network is trained based on the relation extraction model where the training data is a fraction of the base pre-training relation extraction dataset Thereby, the number of samples for each entity type is balanced. This model can be considered as base RE model for pre-training. The advantage of the neural network is that time can be save as training a more sophisticated relation extraction model is costly in terms of time and computational resources. However, alternatively, any other machine learning model can be utilized.

The model is used as the base model for an active learning loop. The human expert corrects the predictions in the active learning loop and hence increases the accuracy of predictions.

Then, another fraction of the base pre-training relation extraction dataset is selected, disjoint from the training fraction. Thereby, the number of samples for each relation type is balanced. This dataset can be equally referred to as the RE active learning validation dataset for pre-training.

The denoising algorithm is applied by passing the base RE model for pre-training as the base relation extraction model and the RE active learning validation dataset for pre-training as the RE active learning validation dataset. The denoising results in the denoised labelled dataset for relation extraction.

Then, a balanced fraction of the denoised labelled dataset for relation extraction is selected (80% for each relation type) and 80% of the RE gold standard dataset. The remaining samples are kept for subsequent evaluations. These selected samples constitute the training dataset for pre-training the relation extraction model.

Then, a new SpanBERT relation extraction model is trained using this training dataset for pre-training the relation extraction model. This model can be equally referred to as the pre-trained denoised relation extraction model.

Fine-Tuning for NER (Use Case-Specific Data)

Each sentence from the noisy labelled dataset for RE is passed to the fine-tuned denoised NER-model to predict entity annotations.

Only those samples are kept where the original and predicted entity annotations match. The samples can be considered as the base fine-tuning relation extraction dataset.

Then, another fraction of the base fine-tuning relation extraction dataset is selected that is disjoint from the aforementioned training fraction. Thereby, the number of samples for each relation type is balanced. This dataset can be equally referred to as the RE active learning validation dataset for fine-tuning.

The denoising algorithm can be applied by passing the pre-trained denoised RE-model as the base RE-model and the RE active learning validation dataset for fine-tuning as the RE active learning validation dataset. The output is the denoised labelled dataset for RE.

Then, a balanced fraction of the denoised labelled dataset is selected for RE (80% for each relation type) and 80% of the RE gold standard dataset.

The remaining samples are kept for subsequent evaluations. These selected samples constitute the training dataset for fine-tuning the RE-model.

Further, the pre-trained denoised RE-model is fine-tuned based on the training dataset. This model is our final RE-model.

Knowledge Graph Construction, Propagating the Raw Text Into the Knowledge Graph

The propagation requires the input dataset with raw texts as input as well as the determined ontology, the denoised NER and RE-models as input.

The input dataset is propagated into the knowledge graph during propagation using the denoised models based on the input dataset and ontology. The propagation results in triples that represent the Knowledge Graph In more detail, all the sentences of the input dataset in form of raw texts 10 are fed into the fine-tuned denoised NER-model. Then, the sentences comprising at least two entity annotations are selected. For each selected sentence of the plurality of sentences, a sample is generated for each pair of entity mention.

If a sample's subject and object (head and tail) entity types do not correspond to any of the subject and object entity types of the properties (relation types) in the ontology, the sample will be discarded. Otherwise, the sample is fed into the denoised RE-model to predict the relation type.

The subject, the relation type, and the object are transformed into a triple in RDF format to express this kind of relational data specifically designed for Knowledge Graphs 20.

The resulting knowledge graph is shown in FIG. 2.

REFERENCE SIGNS

S1 to S8 Method steps 1 to 8
10 input data set
20 knowledge graph

The invention claimed is:

1. A computer-implemented method for determining a denoised named entity recognition model and a denoised relation extraction model, the method comprising:
   a. providing an input dataset with raw texts;
   b. generating an ontology using semantic analysis based on the input dataset, wherein the ontology comprises a plurality of entity types and a plurality of respective relation types between pairs of the entity types;
   c. deriving at least one distant supervision rule for named entity recognition for each entity type of the plurality of entity types and at least one distant supervision rule for relation extraction for each relation type of the plurality of relation types between respective pairs of derived entity types from the generated ontology;
   d. generating at least one noisy labelled dataset for the named entity recognition by applying the at least one distant supervision rule for the named entity recognition on the input dataset to extract a plurality of entity mentions from the input dataset;
   e. generating a least one noisy labelled dataset for the relation extraction by applying the at least one distant supervision rule for the relation extraction on the input dataset to extract a plurality of respective relation mentions between pairs of the entity mentions from the input dataset;
   f. denoising a named entity recognition-model and the at least one noisy labelled dataset for the named entity recognition using active learning to interactively query a user in an active learning loop; wherein
   the user corrects at least one predicted entity type of the named entity recognition-model demonstrating least or low confidence by confirmation or rejection;
   g. denoising a relation extraction model and the at least one noisy labelled dataset for the relation extraction using active learning to interactively query a user in an active learning loop;
   wherein the user corrects at least one predicted relation type of the relation extraction-model demonstrating least or low confidence by confirmation or rejection; wherein
   the relation extraction-model uses the at least one predicted entity type of the named entity recognition-model to predict the at least one relation type; and
   h. training the denoised named entity recognition model using an output dataset that is a combination of originally correct samples in a named entity recognition active learning validation dataset and samples corrected by the user, and training the denoised relation extraction model using an output dataset that is a combination of originally correct samples in a relation extraction active learning validation dataset and samples corrected by the user.

2. The computer-implemented method according to claim 1, wherein the active learning uses uncertainty sampling as a query strategy.

3. The computer-implemented method according to claim 1, wherein the method further comprises at least one of the steps pre-training, training, fine-tuning the respective named entity recognition model, denoised named entity recognition model, relation extraction model and denoised relation extraction model.

4. The computer-implemented method for propagating an input dataset into a graph database representation according to claim 1; wherein
   the graph database representation represents a plurality of nodes in a graph which are interconnected by respective edges; wherein
   each node of the plurality of the nodes represents an entity and each edge of the plurality of the edges represents a relation between the entities; comprising the steps
   a. providing the input dataset with raw texts and an ontology;
   b. determining a plurality of entity types using a trained denoised named entity recognition model based on the input dataset;
   c. selecting pairs of entity types of the plurality of determined entity types matching the provided ontology;
   d. determining a plurality of relation types using a trained denoised relation extraction model based on the selected pairs of entity types; and
   e. propagating the determined entity and relation types into the graph database representation.

5. A computing unit for performing the method steps according to claim 1.

6. A computer program product directly loadable into an internal memory of a computer, comprising software code portions for performing the steps according to claim 1 when said computer program product is running on a computer.

7. The computer-implemented method of claim 1, wherein the denoised named entity recognition model is trained using a majority percentage of the output dataset, and a remaining percentage of the output dataset is kept for evaluating subsequent named entity recognition models.

8. The computer-implemented method of claim 1, wherein the denoised relation extraction model is trained using a majority percentage of the output dataset, and a remaining percentage of the output dataset is kept for evaluating subsequent relation extraction models.

* * * * *